(12) United States Patent
Bazin De Bezons et al.

(10) Patent No.: US 12,555,121 B2
(45) Date of Patent: Feb. 17, 2026

(54) METHOD FOR DETERMINING A SPECIFIC VALUE OF AN INPUT DATA FROM A SET OF PHYSICAL ELEMENTS

(71) Applicant: L'OREAL, Paris (FR)

(72) Inventors: Jean-Dominique Bazin De Bezons, Saint-Ouen (FR); Loic Tran, Clichy (FR); Panagiotis-alexandros Bokaris, Clichy (FR); Constance Cantin, Saint-Ouen (FR); Fabienne Wiltord, Saint-Ouen (FR); Benjamin Askenazi, Saint-Ouen (FR)

(73) Assignee: L'OREAL, Paris (FR)

( * ) Notice: Subject to any disclaimer, the term of this patent is extended or adjusted under 35 U.S.C. 154(b) by 325 days.

(21) Appl. No.: 17/621,800

(22) PCT Filed: Jun. 25, 2020

(86) PCT No.: PCT/EP2020/067938
§ 371 (c)(1),
(2) Date: Dec. 22, 2021

(87) PCT Pub. No.: WO2020/260525
PCT Pub. Date: Dec. 30, 2020

(65) Prior Publication Data
US 2022/0262523 A1   Aug. 18, 2022

(30) Foreign Application Priority Data
Jun. 25, 2019 (FR) .................................. 1906864

(51) Int. Cl.
*G06Q 30/0601* (2023.01)
*G06Q 30/015* (2023.01)
(Continued)

(52) U.S. Cl.
CPC ....... *G06Q 30/015* (2023.01); *G06Q 30/0281* (2013.01); *G06Q 30/0643* (2013.01); *G16H 10/60* (2018.01); *G16H 50/50* (2018.01)

(58) Field of Classification Search
CPC ............. G06Q 30/015; G06Q 30/0281; G06Q 30/0643; G16H 50/50; G16H 10/60
See application file for complete search history.

(56) References Cited

U.S. PATENT DOCUMENTS

| 9,449,412 B1 | 9/2016 | Rogers et al. |
| 2009/0257654 A1 | 10/2009 | Roizen et al. |
| 2015/0145882 A1 | 5/2015 | Nguyen et al. |

(Continued)

FOREIGN PATENT DOCUMENTS

| CN | 102184108 A | 9/2011 |
| CN | 109871564 A | 6/2019 |

(Continued)

OTHER PUBLICATIONS

B.-G. Seo, K.-W. Kim, I.-J. Yoo, J.-Y. Park and D.-H. Park, "Development of Diagnostic Method and Algorithm for Skin Type Based on Consumer Language and Sentiment," 2018 3rd Technology Innovation Management and Engineering Science International Conference (TIMES-iCON), Bangkok, Thailand, 2018 (Year: 2018).*

(Continued)

*Primary Examiner* — Michelle T Kringen
(74) *Attorney, Agent, or Firm* — POLSINELLI PC

(57) ABSTRACT

The present invention relates to a method for determining, from a set of physical elements (10), a specific value of an input data for a tool (12) for determining a customized cosmetic action for an individual (I), each physical element (10) having a sensory property representative of a characteristic of a body zone and associated with an identifier, each identifier being associated with a predefined value of said input data characterizing said body zone according to a (Continued)

Figure 1:
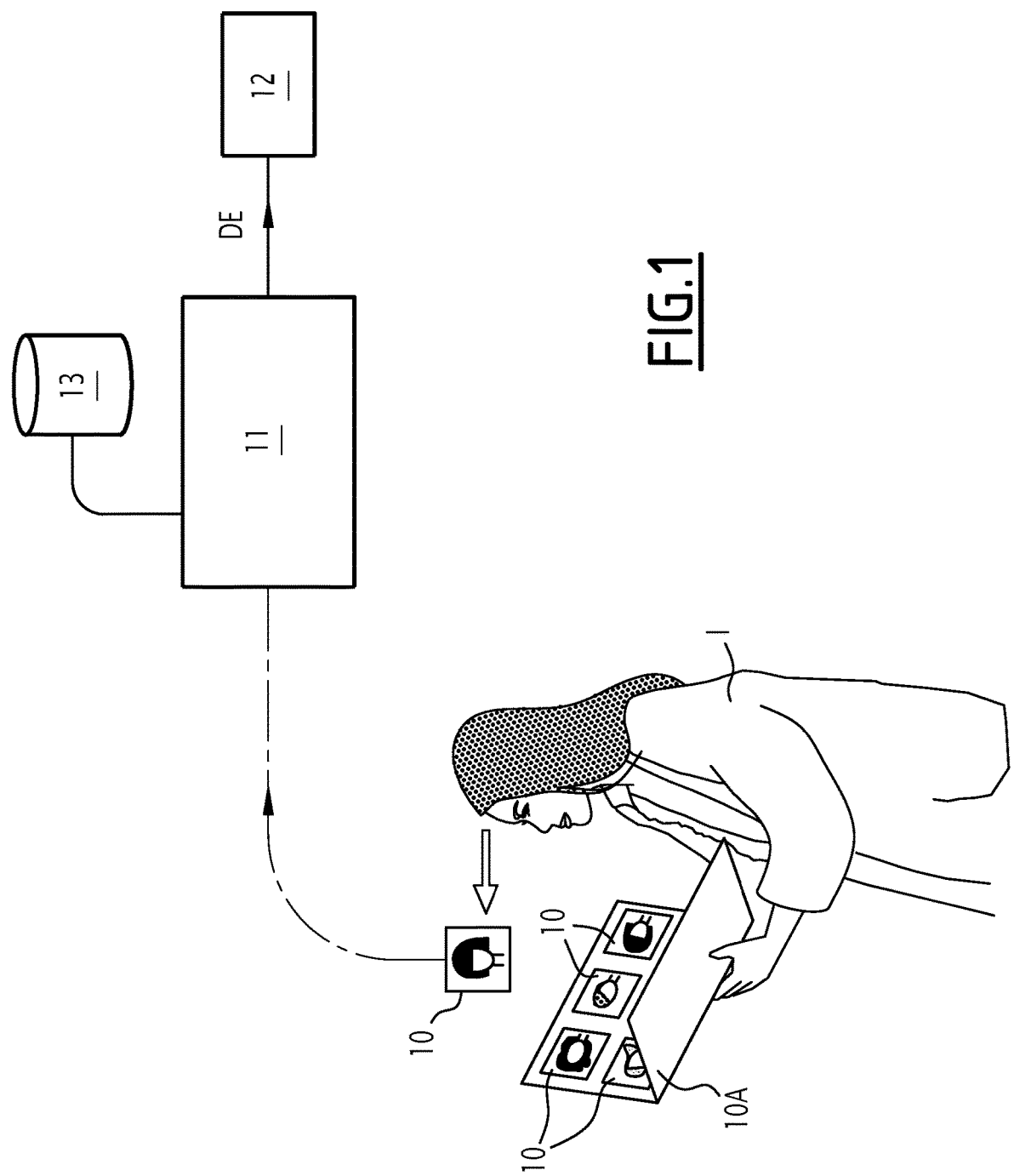

match table, the method comprising the following steps: —selecting a physical element (10) for the individual (I) among the set of physical elements (10), —acquiring, via the calculator (14), the identifier of the selected physical element (10), and —determining, via the calculator (14), the predefined value of the input data corresponding to the identifier acquired according to the match table.

11 Claims, 7 Drawing Sheets

(51) Int. Cl.
*G06Q 30/02* (2023.01)
*G16H 10/60* (2018.01)
*G16H 50/50* (2018.01)

(56) References Cited

U.S. PATENT DOCUMENTS

2015/0248581 A1* 9/2015 Gouda ................ G06T 19/006
345/633
2019/0166980 A1 6/2019 Huang et al.
2019/0340958 A1* 11/2019 Azuma ................ B42D 1/003
2020/0046460 A1* 2/2020 Jang ..................... G16H 40/67
2022/0262523 A1 8/2022 Bazin de Bezons et al.

FOREIGN PATENT DOCUMENTS

| EP | 1 639 940 A1 | 3/2006 |
| JP | 2008003724 A | 1/2008 |
| JP | 2016064307 A | 4/2016 |
| JP | 6470438 B1 | 2/2019 |
| JP | 2022539544 A | 9/2022 |
| WO | WO 2009/089292 A1 | 7/2009 |

OTHER PUBLICATIONS

AI and Machine Learning 2006; See Partial Embedded English Language.
IT>Newsinsight>Article—2024 https://atmarkit.itmedia.co.jp/news/200602/14/ntt.html.

* cited by examiner

METHOD FOR DETERMINING A SPECIFIC VALUE OF AN INPUT DATA FROM A SET OF PHYSICAL ELEMENTS

CROSS REFERENCE TO RELATED APPLICATIONS

This application is a National Phase filing under 35 U.S.C. § 371 of PCT/EP2020/067938 filed on Jun. 25, 2020; which application in turn claims priority to Application No. 19 06864 filed in France on Jun. 25, 2019. The entire contents of each application are hereby incorporated by reference.

The present invention relates to a method for determining, from a set of physical elements, a specific value of at least one input data for a tool for determining a cosmetic action customized for an individual. The present invention also relates to an associated set of physical elements. The present invention further relates to an associated determining device.

One aim of the cosmetic industry is to improve the experience of its consumers. In particular, there is a strong tendency to offer products that are increasingly adapted to the needs and specific characteristics of the user. This tendency is generally called "customization".

The customization of cosmetic products and services may relate to any part of the human body, but is especially interesting for the exposed parts of the body, such as the face (makeup or care products, in particular foundations) and hair (care or coloring products, for example).

It is thus known to recommend suitable foundations using one or several characteristics of a user's skin (for example "Le Teint Particulier"® by LANCÔME®). It is also known to offer custom haircare products, the composition of which is determined from different properties of the user's hair (for example, see document EP 0,443,741, as well as documents WO 2004/002300 A2 and U.S. Pat. No. 9,316,580 B).

The notion of customization goes well beyond merely offering a more or less broad line of products each corresponding to a user category, one difficulty often being the ability to recommend the most appropriate product to the user as a function of specific individual characteristics.

As described in the previously cited documents, the notion of customization generally comprises a first analysis step seeking to obtain one or several data specific to the user in question, these data being used to determine an appropriate treatment and/or one or several appropriate products intended to be applied on the relevant body part of the user.

Until recently, the analysis step was often done manually or visually by an expert, such as a hairdresser or a beauty advisor. It is in particular known to have the user complete a questionnaire, the answers to which may be used to recommend the product that is supposedly most appropriate for said user (see in particular document US 2014/0216492 A). It appears obvious that such a technique is highly uncertain and lacks precision.

There is therefore a need to facilitate and improve the precision in determining data specific to a given individual.

To that end, the present disclosure relates to a method for determining, from a set of physical elements corresponding to a characteristic of a predetermined body zone, of a specific value for an individual of at least one input data for a tool for determining a cosmetic action customized for the individual, each physical element having at least one sensory property, in particular visual or tactile, different from the other physical elements of the set and representative of the characteristic of the body zone, each physical element being associated with an identifier, each identifier being associated with at least one predefined value of said input data characterizing said body zone according to a match table stored in a database, the database being accessible by a calculator, the method comprising the following steps:
selecting a physical element for the individual among the set of physical elements,
acquiring, via the calculator, the identifier of the selected physical element, and
determining, via the calculator, the predefined value of the input data corresponding to the identifier acquired according to the match table.

Such a method makes it possible to determine, simply and precisely, data specific to a given individual. Indeed, the sensory properties of physical elements allow the easy selection of a physical element among a set of physical elements as a function of the needs and/or desires of the individual, the sensory property of this physical element being representative of a characteristic of a body zone. As a function of the selected physical element, the method makes it possible to go back to predefined values making it possible to characterize the body zone precisely. The determined values are intended to be used as input data of a tool for determining cosmetic actions specific to the individual.

Such a method is thus particularly suitable in the context of the customization of cosmetic services offered to a given individual. In particular, such a method makes it possible to facilitate the dialogue and understanding between a beauty professional and a client. The method in particular makes it possible for the individual to have an enjoyable experience in the salon and to communicate with the beauty professional on a common foundation. For the beauty professional, the method makes it possible to have customizable and familiar physical elements (e.g., hair color chart) while working in a calmer atmosphere. For example, it is possible for the client to select a hair dye color through physical objects (for example, when the physical objects are visual representatives of hair) and for the hairstylist to use all of the coloring data represented by the selected physical object through the acquisition and determining steps of the method.

According to specific embodiments, the method comprises one or more of the following features, considered alone or according to any technically possible combinations:
the method comprises a step for operating the tool as a function of the determined value of the input data to determine a cosmetic action customized for the individual;
the operating step comprises:
  a. —determining a model of the body zone of the individual corresponding to the body zone characterized by the input data as a function of the determined value for said input data, and/or
  b. —determining a cosmetic product composition to be applied on the body zone of the individual characterized by the input data corresponding to the body zone as a function of the determined value for said input data, and/or
  c. —determining a treatment to be done on the body zone of the individual corresponding to the body zone characterized by the input data as a function of the determined value for said input data;
the method comprises a step for receiving at least one measurement relative to the body zone of the individual corresponding to the body zone characterized by the input data, the measurement being acquired on the individual via a measuring instrument, the model of the body zone of the individual being obtained as a function of the received measurement;

the operating step comprises acquiring at each instant, via a sensor, movements of the body zone of the individual corresponding to the body zone characterized by the input data, the model of the body zone of the individual being obtained, at each instant, as a function of the acquired movements;

the operating step comprises the display of the model of the body zone of the individual on a screen, the screen advantageously being a connected mirror;

each physical element of the set of physical elements is attached on a same support, the support advantageously being a catalog;

the physical elements are chosen from the list made up of: photographs, post-its, fabrics, figurines, miniature products and real or fake samples of parts of the human body, such as locks of hair, imitation skin samples, fake eyelashes, fake eyebrows or fake nails;

the body zone characterized by the input data is a set of hairs, such as hair, eyelashes or eyebrows, the input data being chosen from: a property representative of a hair color, a property representative of a hair length, a property representative of a type of hair, a property representative of a lifetime of hair, a property representative of a percentage of white hair, a property representative of a variability of the preceding properties and a property resulting from the combination of at least two of the preceding properties; or the body zone characterized by the input data is the skin, such as the skin of the face, the input data being chosen from: a property representative of a skin color, a property representative of a skin texture, a property representative of aging of the skin, a property representative of a variability of the preceding properties and a property resulting from the combination of at least two of the preceding properties; or the body zone characterized by the input data comprises at least one nail, the input data being chosen from: a property representative of a color of the nail, a property representative of a condition of the nail, a property representative of a lifetime of the nail, a property representative of a robustness of the nail, a property representative of a variability of the preceding properties and a property resulting from the combination of at least two of the preceding properties.

The present disclosure also relates to a set of physical elements configured to be used in a determining method as previously defined, each physical element having at least one sensory property, in particular visual or tactile, different from the other physical elements of the set and representative of a characteristic of a predetermined body zone, each physical element being associated with an identifier, each identifier being associated with at least one predefined value of said input data characterizing said body zone according to a match table stored in a database.

According to one specific embodiment, the identifier is chosen from: a number, a series of alphanumeric characters, a barcode, a radio identification marker, a near field communication marker and a marker allowing a visual identification.

The present disclosure further relates to a device for determining, from a set of physical elements corresponding to a characteristic of a predetermined body zone, of a specific value for an individual of at least one input data for a tool for determining a cosmetic action customized for the individual, each physical element having at least one sensory property, in particular visual or tactile, different from the other physical elements of the set and representative of the characteristic of the body zone, each physical element being associated with an identifier, each identifier being associated with at least one predefined value of said input data characterizing said body zone according to a match table stored in a database, the device comprising a calculator having access to the database, the calculator being configured to:

acquire the identifier of a physical element selected for the individual from the set of physical elements, and determine the predefined value of the input data corresponding to the identifier acquired according to the match table.

The invention also relates to a method for determining, from a set of physical elements, of a specific value of at least one input data for a tool for determining a cosmetic action customized for an individual, each physical element having at least one sensory property, in particular visual or tactile, different from the other physical elements of the set and representative of a characteristic of a body zone, each physical element being associated with an identifier, each identifier being associated with at least one predefined value of said input data characterizing said body zone according to a match table stored in a database, the database being accessible by a calculator, the method comprising the following steps:

selecting a physical element for the individual among the set of physical elements, acquiring, via the calculator, the identifier of the selected physical element, and determining, via the calculator, the predefined value of the input data corresponding to the identifier acquired according to the match table.

The present disclosure further relates to a device for determining, from a set of physical elements, of a specific value of at least one input data for a tool for determining a cosmetic action customized for an individual, each physical element having at least one sensory property, in particular visual or tactile, different from the other physical elements of the set and representative of a characteristic of a body zone, each physical element being associated with an identifier, each identifier being associated with at least one predefined value of said input data characterizing said body zone according to a match table stored in a database, the device comprising a calculator having access to the database, the calculator being configured to:

acquire the identifier of a physical element selected for the individual from the set of physical elements, and determine the predefined value of the input data corresponding to the identifier acquired according to the match table.

Figure 2:
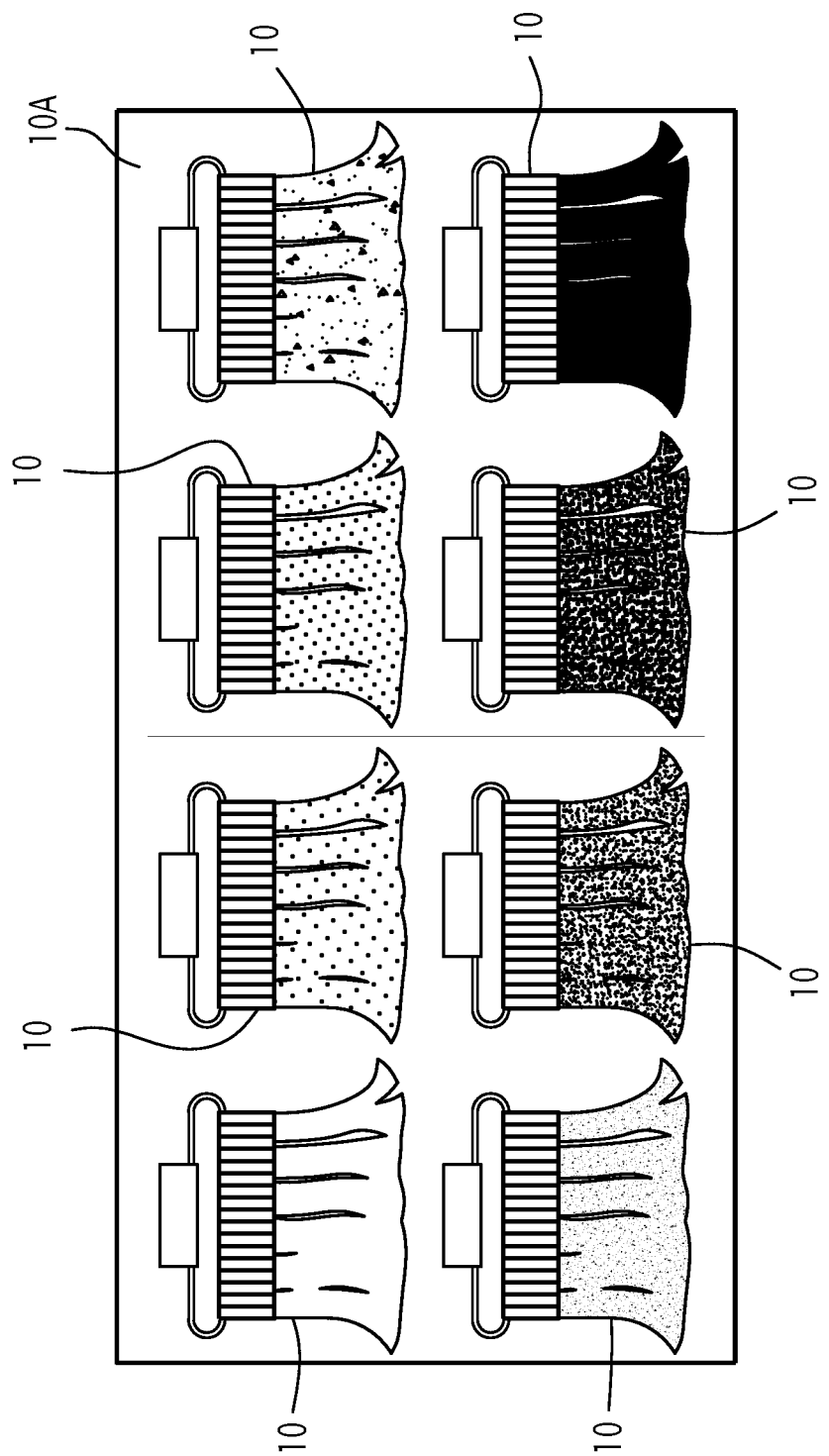
Figure 3:
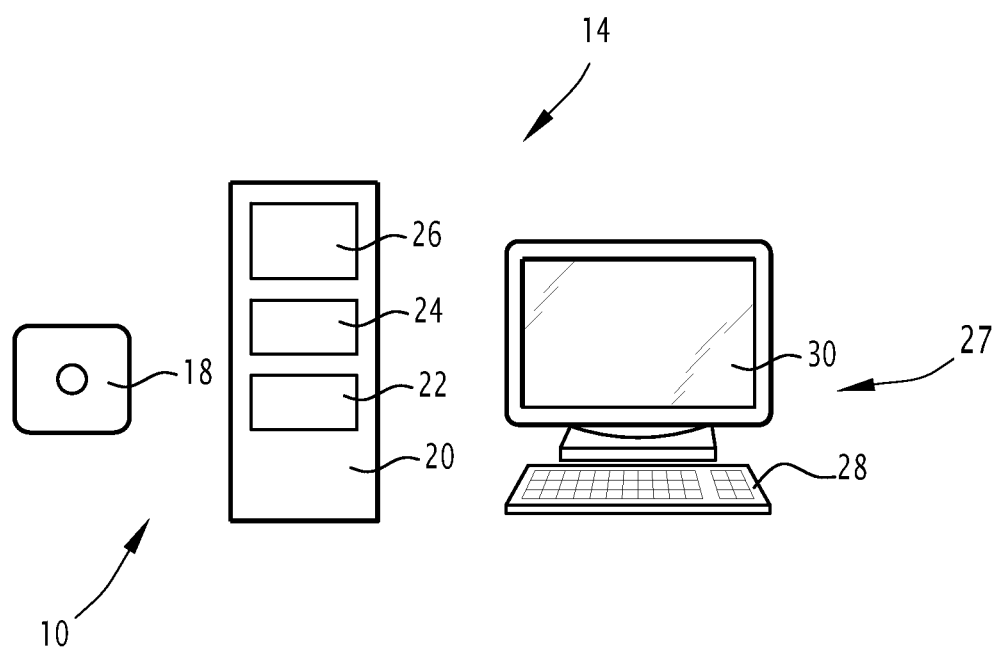
Figure 4:
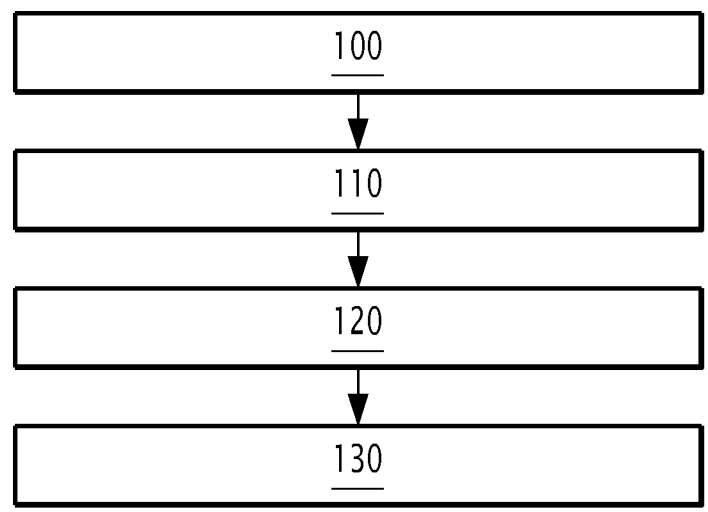
Figure 5:
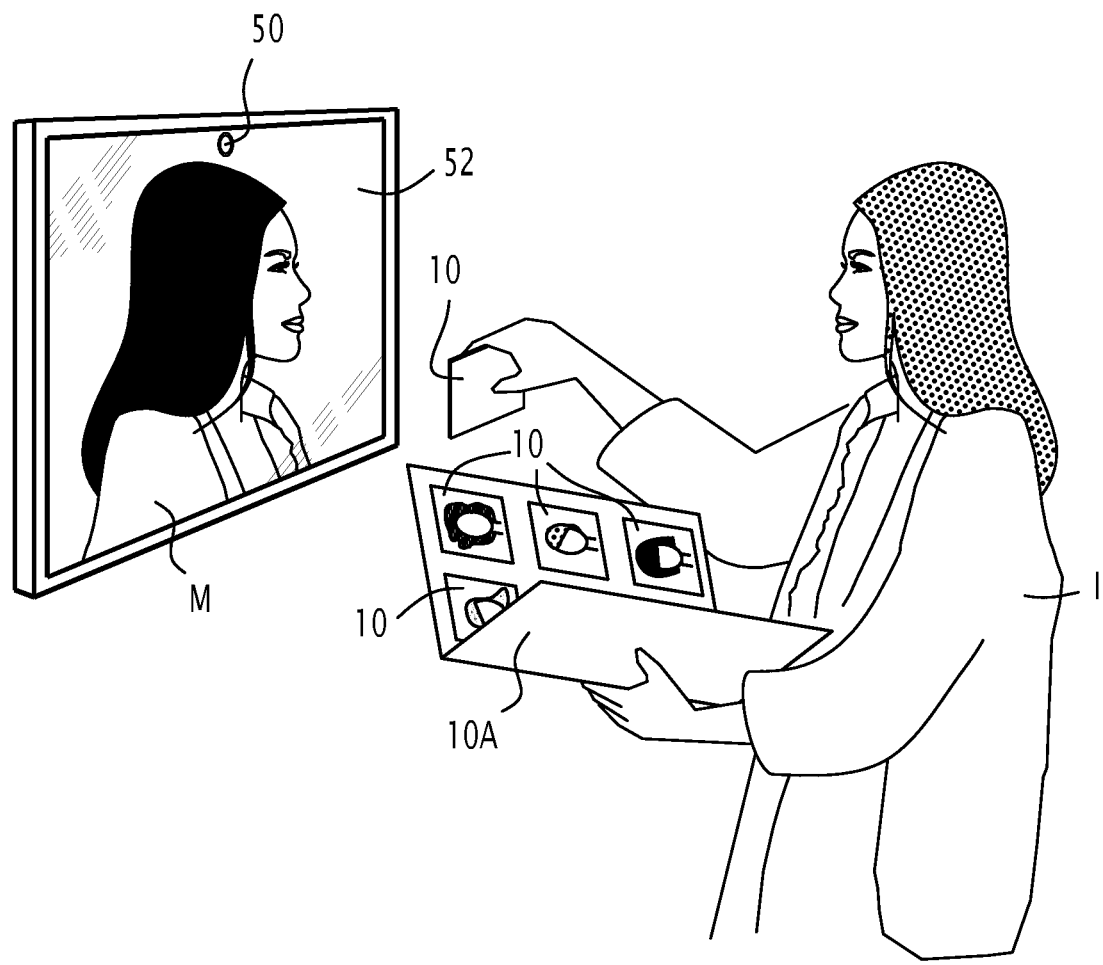
Figure 6:
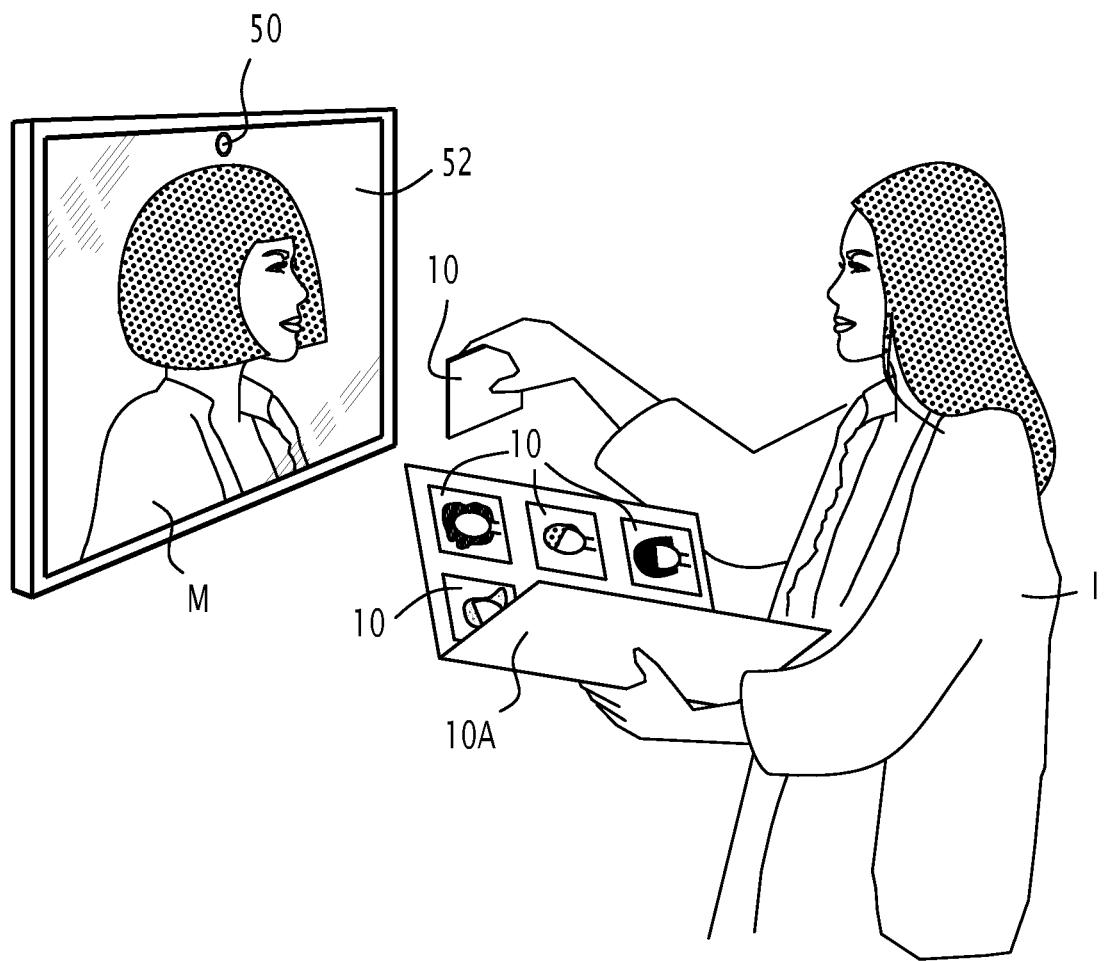
Figure 7:
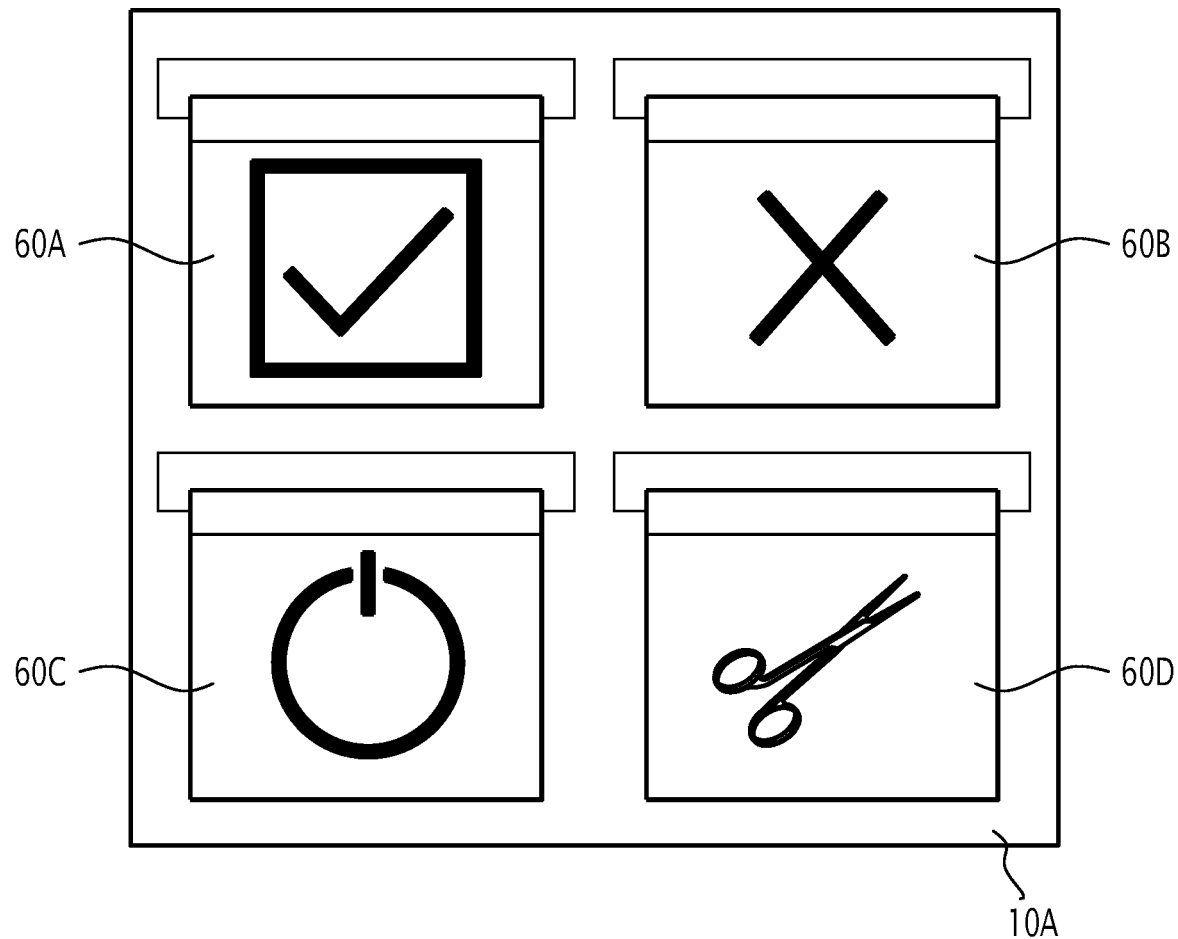

Other features and advantages of the invention will appear upon reading the following description of embodiments of the invention, solely as an example and done in reference to the drawings, which are:

FIG. 1 is a schematic illustration of an example of a scene comprising a set of physical elements, a device for determining specific values of input data and a tool for determining cosmetic actions, FIG. 2 is a schematic illustration of an example of a set of physical elements, FIG. 3 is a schematic illustration of an example of the determining device of FIG. 1, FIG. 4 is a flowchart of an exemplary embodiment of a method for determining, from a set of physical elements, at least one input data specific to a given individual for a tool for determining a cosmetic action customized for the individual, FIG. 5 is a schematic illustration of an example of a cosmetic action determined by the tool, FIG. 6 is a schematic illustration of another example of a cosmetic action determined by the tool, and FIG. 7 is a schematic illustration of an example of interactive objects making it possible to control the determining tool.

In the remainder of the disclosure, the term "hairs" refers to all types of hairs of an individual, irrespective of where they are implanted on the body surface of the individual. The hairs encompass the follicular and capillary systems of the individual. The hair, eyelashes and eyebrows are examples of hairs.

In general, the term "cosmetic product" refers to any substance or mixture intended to be placed in contact with the surface parts of the human body (epidermis, follicular and capillary systems, nails, lips and external genital organs) or with the teeth and oral mucosa in order, exclusively or primarily, to clean them, perfume them, change their appearance, protect them, keep them in good condition or correct bodily odors.

For example, the cosmetic product is a dye formula, also called "dye", intended to be placed in contact with hairs of an individual, such as the hair, to dye them. Such dye is permanent or temporary.

The term "color" for a cosmetic product refers to the visible color or the rendering of the color once the cosmetic product is applied on the hairs of a reference individual or a model of the hairs. Given the differences in nature and lifetime of the hairs from one individual to another, the rendering of the color may vary once the cosmetic product is applied on the hairs of a given individual relative to the rendering obtained for the reference individual or the model of the hairs.

FIG. 1 illustrates one example of a scene comprising a set of physical elements 10, a device 11 for determining specific values of input data DE for a tool 12 for determining cosmetic actions, the tool 12, as well as an individual I moving in the scene. In particular, in the illustrated example, the individual I is interacting with the set of physical elements 10 and the determining device 11.

In particular, the specific values of input data DE characterize a predetermined body zone to be treated, that is to say a body zone on which cosmetic actions can subsequently be determined by the tool 12.

The set of physical elements 10 comprises at least two physical elements 10, advantageously more than two physical elements 10. "Physical element" refers to an object able to be manipulated by an individual.

Each physical element 10 has at least one sensory property, in particular visual or tactile, different from the other physical elements 10 of the set and representative of a characteristic of a body zone, in particular of the predetermined body zone to be treated.

The characteristic of the body zone is, for example, a dimension and/or a color, and/or a state of wear, and/or a state of aging, and/or a physical specificity. In the remainder of the description, one skilled in the art will understand that the terms "body zone" and "part of the human body" are equivalent.

For example, each physical element 10 has a visual representative of the body zone or a feel representative of the body zone. "Representative" means that the physical element 10 gives at least one piece of information on the part of the human body.

Advantageously, the physical elements 10 are chosen from the list made up of: photographs, post-its, fabrics, figurines, miniature products and real or fake samples of parts of the human body, such as locks of hair, imitation skin samples, fake eyelashes, fake eyebrows or fake nails.

Advantageously, each physical element 10 of the set of physical elements 10 is attached, detachably or not, on a same support 10A. The support 10A is preferably portable by the individual I, or able to be manipulated by the individual I.

The support 10A is for example a catalog. The term "catalog" refers to a work in which the physical elements 10 are recorded. An exemplary catalog 10A comprising physical elements 10 in the form of photographs is illustrated by FIG. 1. Another exemplary catalog comprising physical elements 10 in the form of locks of hair is illustrated by FIG. 2, such a catalog thus forming a hair color chart.

Each physical element 10 is associated with an identifier. "Identifier" refers to a data making it possible to identify a physical element 10 among a set of physical elements 10. The identifier is for example recorded in or is an integral part of the physical element 10.

Advantageously, the identifier of each physical element 10 is unique.

The identifiers are for example chosen from the list made up of: a number, a series of alphanumeric characters, a barcode, a radio identification marker (RFID chip), a near field communication marker (NFC chip) and a marker allowing a visual identification. The barcode is, for example, a QR (Quick Response) code.

Each identifier is associated with at least one predefined value of an input data DE of the determining tool 12 characterizing the body zone according to a match table stored in a database 13 (visible in FIG. 1).

Advantageously, the input data in question make it possible to characterize the part of the human body in terms of dimensions and/or color and/or wear and/or aging and/or physical specificities. The predefined values assumed by each input data DE are then respectively chosen from: different possible sizes, different possible colors, different possible states of wear, different possible states of aging and different possible physical specificities. More generally, the input data DE are physicochemical characteristics relating to a predetermined body zone.

For example, when the body zone characterized by the input data DE is a set of hairs, such as the hair, eyelashes or eyebrows, the input data DE is chosen from: a property representative of a hair color, a property representative of a hair length, a property representative of a type of hair, a property representative of a lifetime of hair, a property representative of a percentage of white hair, a property representative of a variability of the preceding properties and a property resulting from the combination of at least two of the preceding properties.

In another example, when the body zone characterized by the input data DE is the skin, such as the skin of the face, the input data DE is chosen from: a property representative of a skin color, a property representative of a skin texture, a property representative of aging of the skin, a property representative of a variability of the preceding properties and a property resulting from the combination of at least two of the preceding properties.

In still another example, when the body zone characterized by the input data the comprises at least one nail, the input data DE is chosen from: a property representative of a color of the nail, a property representative of a condition of the nail, a property representative of a lifetime of the nail, a property representative of a robustness of the nail, a property representative of a variability of the preceding properties and a property resulting from the combination of at least two of the preceding properties.

One skilled in the art will understand that the term "input data" refers, as a function of the context, to a set of input data (for example, the color, the size and the condition). The identifier is then associated with a predefined value for each of the input data of the set.

The determining device 11 is configured to determine specific values of input data DE of the determining tool 12. In other words, the outputs of the determining device 11 correspond to at least one input of the determining tool 12.

One example of such a determining device 11 is illustrated in FIG. 3. In this example, the determining device 11 includes a calculator 14.

The calculator 14 is able to interact with a computer program product 18. The interaction of the computer program product 18 with the calculator 14 makes it possible to implement a method for determining at least one specific value of an input data DE of the determining tool 12.

The calculator 14 is a computer. More generally, the calculator 14 is an electronic calculator able to manipulate and/or transform data represented as electronic or physical quantities in registers of the calculator 14 and/or memories into other similar data corresponding to physical data in the memories, registers or other types of display, transmission or storage devices.

The calculator 14 includes a processor 20 comprising a processing unit 22, memories 24 and an information medium reader 26. In the example illustrated by FIG. 3, the calculator 14 also comprises a man-machine interface 27 for example comprising a keyboard 28 and/or a touch-sensitive interface and a display 30.

The computer program product 18 includes a readable information medium. A readable information medium is a medium readable by the calculator 14, usually by the processing unit 22 of the calculator 14. The readable information medium is a medium suitable for storing electronic instructions and able to be coupled with a bus of a computer system.

As an example, the readable information medium is a floppy disk, an optical disc, a CD-ROM, a magnetic-optical disc, a ROM memory, a RAM memory, an EPROM memory, an EEPROM memory, a magnetic card or an optical card.

A computer program comprising program instructions is stored on the readable information medium. The computer program can be loaded on the data processing unit 22 and is suitable for driving the implementation of at least one of the steps of a method for determining at least one specific value of input data DE of the determining tool 12.

The determining device 11 has access to the database 13 in which the match table is stored.

For example, the database 13 is stored on a remote server of the determining device 11, the access to the database 13 then being done according to a wireless transmission protocol or according to a cellular telecommunications network protocol. The wireless transmission protocol is, for example, established according to the standards of group IEEE 802.11 (Wi-Fi) or group IEEE 802.15 (Bluetooth). The cellular telecommunications network protocol is, for example, established according to the GSM (Global System for Mobile Communications) standard or according to the UMTS (Universal Mobile Telecommunications System), 4G, or even 5G technologies.

In a variant, the database 13 is stored in a memory 24 of the calculator 14, which makes it directly accessible by the calculator 14 without wireless transmission protocol or cellular telecommunications network.

The tool 12 for determining cosmetic actions is configured to determine, from specific values of input data DE (in particular determined by the determining device 11), at least one cosmetic action customized for a given individual I. The determined cosmetic action(s) thus form the output data of the tool 12.

The determined cosmetic actions are for example modeling actions of part of the human body, actions to determine a cosmetic product composition to be applied on part of the human body or cosmetic treatment actions for part of the human body (dyeing of hairs, cutting hair, epilation, makeup, treatment of irregularities of the face).

The tool 12 is for example a computer program stored in the readable information medium of the computer program product 18, or is an application or an algorithm stored in a memory of the calculator 14. In this case, the tool 12 is directly accessible by the calculator 14.

In a variant, the tool 12 is a separate physical entity from the determining device 11. In this case, the tool 12 for example communicates with the determining device 11 by wired connection or by a wireless transmission protocol or cellular telecommunication network, as previously described. The tool 12 then for example comprises a calculator interacting with a computer program product. The interaction of the computer program product with the calculator makes it possible to implement a method for determining cosmetic actions customized for an individual I. In this case, the calculator of the tool 12 is, for example, identical to the calculator 14 of the determining device 11 and the computer program product of the tool 12 is, for example, structurally identical to the computer program product 18 of the determining device 11.

An exemplary embodiment of a method for determining at least one value of an input data DE specific to a given individual I for the determining tool 12, from the set of physical elements 10, is now described in reference to the flow chart of FIG. 4.

The method comprises a step 100 for selecting a physical element 10 for the individual I among the set of physical elements 10. "For the individual" means that the selection is made by taking account of the desires and/or needs of the individual I. The selection will therefore a priori be different from one individual I to the next. In this way, the selection is specific to a given individual I. Such a selection is made possible by the distinctive sensory properties of the different physical elements 10 of the set.

The selection is made by the individual I himself or by a third party taking account of the desires and/or needs of the individual I. The third party is, for example, a beauty professional, such as a hairdresser, a stylist, an esthetician or a makeup artist.

For example, in the context of dyeing the hair (or more generally hairs), when the physical elements 10 procure a visual that is representative of different hair colors, the selection consists of selecting the physical element 10 corresponding to a target dye color. Alternatively, the selection consists of selecting the physical element 10 that corresponds to the natural hair color of the individual I or the current hair color of the individual I (in particular when the hair has already been dyed).

In another example, for cutting hair (more generally hairs), when the physical elements 10 procure a visual that is representative of different haircuts, the selection consists of selecting the physical element 10 that corresponds to a target haircut or the current haircut of the individual I.

In still another example, in the case of a makeup action of the face, when the physical elements 10 procure a visual that is representative of different makeup options for the face (for example, different foundations), the selection consists of selecting the physical element 10 that corresponds to a target makeup. More specifically, in the case of foundations, the selection for example consists of selecting the physical element 10 corresponding to a target foundation color, a target foundation texture or a current skin color or texture of the face of the individual I.

In the example illustrated by FIG. 1, the individual I consults a catalog in which the physical elements 10 are fixed and selects a specific physical element 10 from the catalog. In this example, the physical elements 10 are detachable photographs, the selected physical element 10 having been detached from the catalog.

The method next comprises a step 110 for acquisition, by the calculator 14 of the determining device 11, of the identifier of the selected physical element 10.

When the identifier is a number, a series of alphanumeric characters or a marker allowing a visual identification, the identifier is for example communicated manually, by the individual I or by a third party, to the determining device 11 via the man-machine interface 27.

When the identifier is a barcode, the identifier is, for example, acquired by the determining device 11 via a barcode reader.

When the identifier is a radio identification marker, the identifier is, for example, acquired by the determining device 11 via a radio identification reader.

When the identifier is a near field communication marker, the identifier is, for example, acquired by the determining device 11 via a near field communication reader.

The method next comprises a step 120 for determining, via the calculator 14 of the determining device 11, the predefined value of the input data DE corresponding to the identifier acquired according to the match table. In particular, the value of the input data DE is determined by assigning the predefined value of input data DE stored in the correspondence table and corresponding to the acquired identifier.

As previously mentioned, the present determining step 120 also applies in the case where the input data DE corresponds to a set of input data. In this case, predefined values are determined for each input data of the set.

At the end of the determining step 120, the predefined values of the obtained input data DE are specific to the individual I because they are obtained either via a selection (choice) made by the individual I directly, or by a selection made by a third party as a function of the desires and/or needs of the individual I.

The method comprises a step 130 for operating the tool 12 as a function of the determined value of the input data DE in order to determine a customized cosmetic action for the individual I. "Customized" means that the cosmetic action is determined as a function of values of the input data DE that are specific to the individual I which themselves have been obtained as a function of the desires and/or needs of the individual I. The determined cosmetic action will therefore a priori be different from one individual I to another.

The operating step 130 is carried out specifically as a function of the type of cosmetic action that the tool 12 seeks to determine.

In a first exemplary embodiment, the cosmetic action consists of determining a model M from a part of the human body. The operating step comprises determining a model M of the body zone of the individual I corresponding to the body zone characterized by the input data DE as a function of the determined value for said input data DE.

In this first example, the method optionally comprises an additional step for receiving at least one measurement relative to the body zone of the individual corresponding to the body zone characterized by the input data DE. The model M of the body zone of the individual I is then obtained as a function of the received measurement. The measurement is for example acquired on the individual I via a measuring instrument. The measuring instrument is for example a scanner. For example, in the case of a model M of the hair of the individual I, the measurement comes from a scan of the hair of the individual I. The receiving step is for example done upstream from the operating step 130 or is a sub-step of the operating step 130.

In this first example, as an optional addition, the operating step comprises a step for acquiring at each instant, via a sensor, movements of the part of the body of the individual I, for example, movements of the hair, the face or more generally the head of the individual I. The model M of the part of the human body is then obtained, at each instant, as a function of the acquired movements. "At each instant" means that the action (acquisition or modeling, in particular) is performed at brief time intervals, that is to say, practically in real time, or in real time.

In this first example, the operating step 130 advantageously comprises displaying the model M of the part of the human body on a screen, such as the display 30 of the determining device 11 when the tool 12 is integrated into the device 11. The screen is, for example, a connected mirror able to display a model M accounting for measurements relative to the body zone of the individual I and movements of parts of the body of the individual I.

Sample models M are illustrated in FIGS. 5 and 6.

In the example of FIG. 5, the model M relates to the head of the individual I and the input data DE is a target hair color. In this example, the individual I has selected a photograph (physical element), from a catalog of photographs, corresponding to the desired target color. This makes it possible to obtain, at the end of the method, a model M of the head of the individual I with the desired target color for the hair. In this example, a sensor 50, such as a camera, makes it possible to track the movements of the head of the individual I and a camera 52 makes it possible to display the model M.

The example of FIG. 6 is similar to that of FIG. 5, with the difference that the input data DE is a target hair length, which makes it possible to obtain, at the end of the method, a model M of the head of the individual I with the desired target length for the hair.

In a second exemplary embodiment, the cosmetic action consists of determining a cosmetic product composition to be applied on the body zone of the individual I corresponding to the body zone characterized by the input data DE. The operating step 130 then comprises determining a cosmetic product composition to be applied on said body zone of the individual as a function of the determined value for said input data DE.

For example, from the initial skin color of an individual I and the desired final shade (input data DE of the tool 12), the determination of the cosmetic composition is for example made by a method as described in documents U.S. Pat. No. 5,478,238 or 9,519,927 in the case of foundation products.

In a third exemplary embodiment, the cosmetic action consists of determining treatment to be done on the body zone of the individual I corresponding to the body zone characterized by the input data DE. The operating step 130 then comprises determining a treatment to be done on said body zone as a function of the determined value for said input data DE. The input data DE then allow the tool 12 to determine a diagnosis and to propose a treatment as a function of such a diagnosis.

For example, if the input data DE relate to aging of a part of the body, the determined action may consist of applying a specific product to slow aging or a recommendation, for example, to avoid sun exposure.

In addition, the operating step 130 may include one or several of the features of the first, second and third exemplary embodiments when these features are compatible.

As an optional addition, a set of so-called interactive physical objects 60 is also presented to the individual I among the set of physical objects 10.

Preferably, each interactive object 60 has at least one sensory property, in particular visual or tactile, different from the other physical objects 60 and physical elements 10. For example, each interactive object 60 has a visual or a texture representative of a command of the tool 12. The interactive objects 60 thus allow the individual I or a third party to control the determining tool 12, in particular to stop or start the tool 12, change the usage mode of the tool 12 (modeling, determination of a composition, determination of a treatment) or validate a cosmetic action determined by the tool 12.

Advantageously, the interactive objects 60 assume the same form as the physical objects 10 (for example: the interactive objects are photographs if the physical elements 10 are photographs) and, if applicable, are attached on the same support 10A as the physical elements 10.

An example of interactive objects is illustrated in FIG. 7. In this example, the interactive objects are of the post-it type. The interactive object 60A has a visual representative of a validation command of an action determined by the tool 12 (for example, a simulation satisfying the wishes or needs of the individual I). The interactive object 60B has a visual representative of a command to stop the tool 12 (or to stop the session in progress on the tool 12). The interactive object 60C has a visual representative of a command to start the tool 12 (or to start a new session by the tool 12). The interactive object 60D has a visual representative of a command to change the usage mode of the tool 12 (for example, when the tool 12 is configured to determine a hair color simulation, the interactive object 60D makes it possible to configure the tool 12 for a hair color simulation).

Each interactive object is associated with an identifier. Advantageously, the identifier of each interactive object is unique. The identifier of the interactive object is advantageously of the same type as those of the physical elements 10.

Each identifier is associated with a control command of the tool 12 stored in the database 13.

Thus, in the same way as for the physical elements 10, the method optionally comprises a step for selecting an interactive object, acquiring, via the calculator 14, the identifier of the interactive object, and commanding the determining tool 12 as a function of the command associated with the identifier of the interactive object in the database 13.

Thus, such a method makes it possible to obtain values of the input data specifically describing a part of the human body from a set of physical elements 10 having at least one distinctive sensory property characterizing said part of the human body. This makes it possible to facilitate the determination of data specific to an individual I. Furthermore, the precision of the obtained data is also improved due to sensory properties of the physical elements 10.

One skilled in the art will understand that the embodiments previously described can be combined to form new embodiments as long as they are technically compatible.

The invention claimed is:

1. A method for determining, from a set of physical elements corresponding to a characteristic of a predetermined body zone, of a specific value for an individual (I) of at least one input data (DE) corresponding to the characteristic of said body zone, for a tool for determining a cosmetic action customized for the individual (I), each physical element having at least one sensory property different from the other physical elements of the set and representative of the characteristic of the body zone, each physical element being associated with an identifier, each identifier being associated with at least one predefined value of the at least one input data (DE) characterizing said body zone according to a match table stored in a database, the database being accessible by a calculator, the method comprising the following steps:

selecting a physical element for the individual among the set of physical elements, which is chosen from real or fake samples of parts of the human body, acquiring, via the calculator, the identifier of the selected physical element, wherein the identifier is chosen from: a number, a series of alphanumeric characters, a barcode, a radio identification marker, a near field communication marker and a marker allowing a visual identification, and determining, via the calculator, the predefined value of the at least one input data (DE) corresponding to the identifier acquired according to the match table, wherein the method comprises a step for operating the tool as a function of the determined value of the at least one input data to determine a cosmetic action customized for the individual, the operating step determining a model of the body zone of the individual corresponding to the body zone characterized by the at least one input data as a function of the determined value for the at least one input data, wherein the body zone characterized by the at least one input data (DE) is a set of hairs, the at least one input data (DE) being chosen from: a property representative of a hair color, a property representative of a hair length, a property representative of a type of hair, a property representative of a lifetime of hair, a property representative of a percentage of white hair, a property representative of a variability of the preceding properties and a property resulting from the combination of at least two of the preceding properties, and the operating step comprises acquiring at each instant, via a sensor, movements of the body zone of the individual corresponding to the body zone characterized by the at least one input data, the model of the body zone of the individual being obtained, at each instant, as a function of the acquired movements.

2. The method according to claim 1, wherein the operating step comprises determining a model (M) of the body zone of the individual (I) corresponding to the body zone characterized by the at least one input data (DE) as a function of the determined value for the at least one input data (DE), and the method further comprises a step for receiving at least one measurement relative to the body zone of the individual (I) corresponding to the body zone characterized by the at least one input data (DE), the measurement being acquired on the individual (I) via a measuring instrument, the model (M) of the body zone of the individual (I) being obtained as a function of the received measurement.

3. The method according to claim 2, wherein the operating step comprises acquiring at each instant, via a sensor, movements of the body zone of the individual (I) corresponding to the body zone characterized by the at least one input data (DE), the model (M) of the body zone of the individual (I) being obtained, at each.

4. The method according to claim 2, wherein the operating step comprises the display of the model (M) of the body zone of the individual (I) on a screen, the screen advantageously being a connected mirror.

5. The method according to claim 2, wherein each physical element of the set of physical elements is attached on a same support, the support advantageously being a catalog.

6. The method according to claim 1, wherein the operating step comprises determining a model (M) of the body zone of the individual (I) corresponding to the body zone characterized by the at least one input data (DE) as a function of the determined value for the at least one input data (DE), and display of the model (M) of the body zone of the individual (I) on a screen, the screen advantageously being a connected mirror.

7. The method according to claim 6, wherein the operating step comprises the display of the model (M) of the body zone of the individual (I) on a screen, the screen advantageously being a connected mirror.

8. The method according to claim 6, wherein each physical element of the set of physical elements is attached on a same support, the support advantageously being a catalog.

9. The method according to claim 1, wherein each physical element of the set of physical elements is attached on a same support, the support advantageously being a catalog.

10. A set of physical elements configured to be used in a determining method according to claim 1, each physical element having at least one sensory property, in particular visual or tactile, different from the other physical elements of the set and representative of a characteristic of a predetermined body zone, each physical element being associated with an identifier, each identifier being associated with at least one predefined value of the at least one input data (DE) characterizing said body zone according to a match table stored in a database.

11. A device for determining, from a set of physical elements corresponding to a characteristic of a predetermined body zone, of a specific value for an individual (I) of at least one input data (DE) corresponding to the characteristic of said body zone, for a tool for determining a cosmetic action customized for the individual (I), each physical element having at least one sensory property different from the other physical elements of the set and representative of the characteristic of the body zone, each physical element being associated with an identifier, each identifier being associated with at least one predefined value of the at least one input data (DE) characterizing said body zone according to a match table stored in a database, the device comprising a calculator having access to the database, the calculator being configured to:

acquire the identifier of a physical element selected for the individual (I) from the set of physical elements, which is chosen from real or fake samples of parts of the human body, and determine the predefined value of the at least one input data (DE) corresponding to the identifier acquired according to the match table, wherein the identifier is chosen from: a number, a series of alphanumeric characters, a barcode, a radio identification marker, a near field communication marker and a marker allowing a visual identification, the tool being configured to operate as a function of the determined value of the at least one input data to determine a cosmetic action customized for the individual, and to determine a model of the body zone of the individual corresponding to the body zone characterized by the at least one input data as a function of the determined value for the at least one input data, wherein the body zone characterized by the at least one input data (DE) is a set of hairs, the at least one input data (DE) being chosen from: a property representative of a hair color, a property representative of a hair length, a property representative of a type of hair, a property representative of a lifetime of hair, a property representative of a percentage of white hair, a property representative of a variability of the preceding properties and a property resulting from the combination of at least two of the preceding properties, and and a sensor for acquiring at each instant, movements of the body zone of the individual corresponding to the body zone characterized by the at least one input data, the model of the body zone of the individual being obtained, at each instant, as a function of the acquired movements.

* * * * *